United States Patent
Kim (10) Patent No.: US 11,372,899 B2
(45) Date of Patent: Jun. 28, 2022

(54) METHOD AND SYSTEM FOR SELECTING TARGET DATA

(71) Applicant: ARMIQ Co., Ltd., Seoul (KR)

(72) Inventor: Oxoo Kim, Seoul (KR)

(73) Assignee: ARMIQ CO., LTD., Seoul (KR)

( * ) Notice: Subject to any disclaimer, the term of this patent is extended or adjusted under 35 U.S.C. 154(b) by 0 days.

(21) Appl. No.: 17/409,631

(22) Filed: Aug. 23, 2021

(65) Prior Publication Data

US 2022/0075802 A1   Mar. 10, 2022

(30) Foreign Application Priority Data

Sep. 10, 2020   (KR) .................. 10-2020-0116251

(51) Int. Cl.
*G06F 16/28* (2019.01)
*G06F 16/22* (2019.01)

(52) U.S. Cl.
CPC ........ *G06F 16/285* (2019.01); *G06F 16/2282* (2019.01)

(58) Field of Classification Search
CPC ...... G06F 16/285; G06F 16/289; G06F 8/427; G06F 16/2246
USPC ........................................ 707/737
See application file for complete search history.

(56) References Cited

U.S. PATENT DOCUMENTS

| | | | |
|---|---|---|---|
| 2005/0073731 A1* | 4/2005 | Deer ................ | H04N 1/6033 358/518 |
| 2019/0243629 A1* | 8/2019 | Gass ................. | G06F 8/40 |
| 2019/0243641 A1* | 8/2019 | Gass ................. | G06F 8/427 |

FOREIGN PATENT DOCUMENTS

| | | |
|---|---|---|
| JP | 2003-288355 A | 10/2003 |
| JP | 2007094570 A | 4/2007 |
| KR | 10-20150056989 A | 5/2015 |
| KR | 10-20150112961 A | 10/2015 |
| KR | 10-1656750 | 9/2016 |
| KR | 10-16635470000 B1 | 9/2016 |
| KR | 10-20180096066 A | 8/2018 |
| KR | 10-20190013425 | 2/2019 |
| KR | 10-2020000070 A | 1/2020 |

OTHER PUBLICATIONS

Notice of Allowance dated May 14, 2021, issued in Korean Application No. 10-2020-0116251, filed Sep. 10, 2020, 8 pages.
Office Action dated Nov. 18, 2020, issued in Korean Application No. 10-2020-0116251, filed Sep. 10, 2020, 14 pages.
Notice of Refusal dated Mar. 26, 2021, issued in Korean Application No. 10-2020-0116251, filed Sep. 10, 2020, 8 pages.

* cited by examiner

*Primary Examiner* — Hung T Vy
(74) *Attorney, Agent, or Firm* — Christensen O'Connor Johnson Kindness PLLC (57) ABSTRACT

Disclosed are a method and system for selecting target data. The method of selecting target data may include steps of grouping data included in a database into objects each being a minimum process processing unit based on dependency between tables within the database, setting a selection criterion for target data based on at least one field of the data included in the database, and extracting target data corresponding to the set selection criterion by taking into consideration dependency between tables included in the object.

8 Claims, 10 Drawing Sheets

| Table 1 | | |
|---|---|---|
| Doc. No. | Date | ... |
| 1 | 2002.01 | ... |
| 2 | 2002.02 | ... |
| 3 | 2002.03 | ... |
| 4 | 2002.03 | |

| Table 2 | | |
|---|---|---|
| Doc. No. | Item No. | Plant |
| 1 | 001 | P100 |
| 1 | 002 | P200 |
| 2 | 001 | P200 |

| Table 3 | | |
|---|---|---|
| Doc. No. | Status | Ref. No. |
| 1 | Complete | R01 |
| 2 | In-Progress | R02 |
| 4 | Initial | R03 |

| Table 4 | | |
|---|---|---|
| Ref. No. | Region | ... |
| R01 | USA | ... |
| R02 | France | ... |
| R03 | Korea | ... |

METHOD AND SYSTEM FOR SELECTING TARGET DATA

CROSS-REFERENCES TO RELATED APPLICATION

This application is based on and claims priority under 35 U.S.C. 119 to Korean Patent Application No. 10-2020-0116251, filed on Sep. 10, 2020 in the Korean intellectual property office, the disclosures of which are herein incorporated by reference in its entirety.

TECHNICAL FIELD

The following description relates to a method and system for selecting target data.

BACKGROUND OF THE INVENTION

Many mergers and acquisitions (M&A) recently occur between overseas firms and domestic companies. M&A has a tendency spotlighted as a keyword for corporate management.

A company can consistently seek growth and development by using external resources, and can have effects in that the time to enter a new market is reduced, friction with the existing market participant is avoided, a market dominating power is increased, and an advanced technology is introduced. Furthermore, in order to be adapted to a varying environment, M&A activities for arranging and selling the existing marginal firm and performing enterprise/business take-over for securing a new business motive are gradually increased.

In this case, a buying company wants consistent business continuity for an organization of a selling company by requesting the transfer of an IT system from the selling company. A selling company does not want to transfer, as business assets, its own organization data that is not sold. Accordingly, there is an increasing need for a technology capable of precisely selecting, separating, and transmitting a large amount of data within a system depending on requirements and converting data.

SUMMARY

This summary is provided to introduce a selection of concepts in a simplified form that are further described below in the Detailed Description. This summary is not intended to identify key characteristics of the claimed subject matter, nor is it intended to be used as an aid in determining the scope of the claimed subject matter.

Embodiments provide a method and system for selecting target data, which can select target data by taking dependency between tables into consideration.

Embodiments provide a method and system for selecting target data, which can modulate data in a database through selection, a combination, exclusion, an addition, etc. depending on various data processing purposes, such as archiving, cleansing, transmission, conversion, encryption, and unidentification, and can select required target data.

In an aspect, there is provided a method of selecting, by a computer device including least one processor, target data, including steps of grouping, by the at least one processor, data included in a database into objects each being a minimum process processing unit based on dependency between tables within the database, classifying, by the at least one processor, the objects based on at least one of an application area, a data type and a characteristic according to a process, setting, by the at least one processor, a selection criterion for target data based on at least one field of the data included in the database and the classification of the objects, and extracting, by the at least one processor, target data corresponding to the set selection criterion by taking into consideration dependency between tables included in the object.

According to an aspect, the step of setting selection criterion may include setting the selection criterion for the target data based on (1) a period field having a range of a specific time or period related to data as a field value, (2) an organization field having a field value of at least one of a corporate code, a plant, a sales organization and a department, and (3) at least one field of other characteristic fields each having a field value of at least one of a region, a country code, a language, a user, a document type, a customer group and a constructor.

According to another aspect, the method may further include a step of classifying, by the at least one processor, the objects based on at least one of an application area, a data type and a characteristic according to a process.

According to still another aspect, the method may further include a step of setting, by the at least one processor, a purpose of using the target data as any one of selective archiving, backup, cleansing, transmission, conversion, unidentification and encryption.

According to still another aspect, the selection criterion and an object which is a selection target may be different depending on a use target of the set target data.

According to still another aspect, the step of extracting target data may include searching for a key value of the highest header table among tables within the object, and extracting the target data by sequentially extracting data corresponding to the retrieved key value based on dependency between tables within the object.

According to still another aspect, the method may further include a step of setting, by the at least one processor, an addition criterion for data to be excluded from the target data or data to be added to the target data.

In an aspect, there is provided a computer program coupled to a computer device and stored in a computer-readable recording medium for executing the method in the computer device.

In an aspect, there is provided a computer-readable recording medium on which a program for executing the method in the computer device is recorded.

In an aspect, a computer device includes at least one processor implemented to execute a computer-readable instruction. The at least one processor is configured to grouping data included in a database into objects each being a minimum process processing unit based on dependency between tables within the database, classify the objects based on at least one of an application area, a data type and a characteristic according to a process, set a selection criterion for target data based on at least one field of the data included in the database and the classification of the objects, and extract target data corresponding to the set selection criterion by taking into consideration dependency between tables included in the object.

Target data can be selected by taking into consideration dependency between tables.

Data in a database can be modulated through selection, a combination, exclusion, an addition, etc. depending on various data processing purposes, such as archiving, cleansing, transmission, conversion, encryption, and unidentification, and required target data can be selected.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the invention.

The present disclosure may be changed in various ways and may have various embodiments, and specific embodiments are illustrated in the drawings and described in detail. It is however to be understood that the present disclosure is not intended to be limited to the specific disclosure and that the present disclosure includes all changes, equivalents and substitutions which fall within the spirit and technological scope of the present disclosure. In the drawings, similar elements are assigned similar reference numerals.

Terms, such as a first, a second, A, and B, may be used to describe various elements, but the elements should not be restricted by the terms. The terms are used to only distinguish one element from the other element. For example, a first element may be named a second element without departing from the scope of rights of the present disclosure. Likewise, a second element may be named a first element. The term "and/or" includes a combination of a plurality of related and illustrated items or any one of a plurality of related and described items.

When it is said that one element is "connected" or "coupled" to the other element, it should be understood that one element may be directly connected or coupled" to the other element, but a third element may exist between the two elements. In contrast, when it is described that one element is "directly connected" or "directly coupled" to the other element, it should be understood that a third element does not exist between the two elements.

The terms used in this application are used to only describe specific embodiments and are not intended to restrict the present disclosure. An expression of the singular number should be construed as including an expression of the plural number unless clearly defined otherwise in the context. It is to be understood that in this application, a term, such as "include (or comprise)" or "have", is intended to designate that a characteristic, number, step, operation, element or part which is described in the specification or a combination of them are present and does not exclude the existence or possible addition of one or more other characteristics, numbers, steps, operations, elements, parts or combinations of them in advance.

All terms used herein, including technical terms or scientific terms unless defined otherwise in the specification, have the same meanings as those commonly understood by a person having ordinary skill in the art to which the present disclosure pertains. Terms, such as those commonly used and defined in dictionaries, should be construed as having the same meanings as those in the context of a related technology, and should not be construed as having ideal or excessively formal meanings unless explicitly defined otherwise in the specification.

Hereinafter, embodiments are described in detail with reference to the accompanying drawings.

A system for selecting target data according to embodiments of the present disclosure may be implemented by at least one computer device. A method for selecting target data according to embodiments of the present disclosure may be performed through at least one computer device included in the system for selecting target data. A computer program according to an embodiment of the present disclosure may be installed and driven in the computer device. The computer device may perform the method for selecting target data according to embodiments of the present disclosure under the control of the driven computer program. The computer program may be coupled to the computer device, and may be stored in a computer-readable recording medium in order to execute the method for selecting target data in the computer device.

Figure 1:
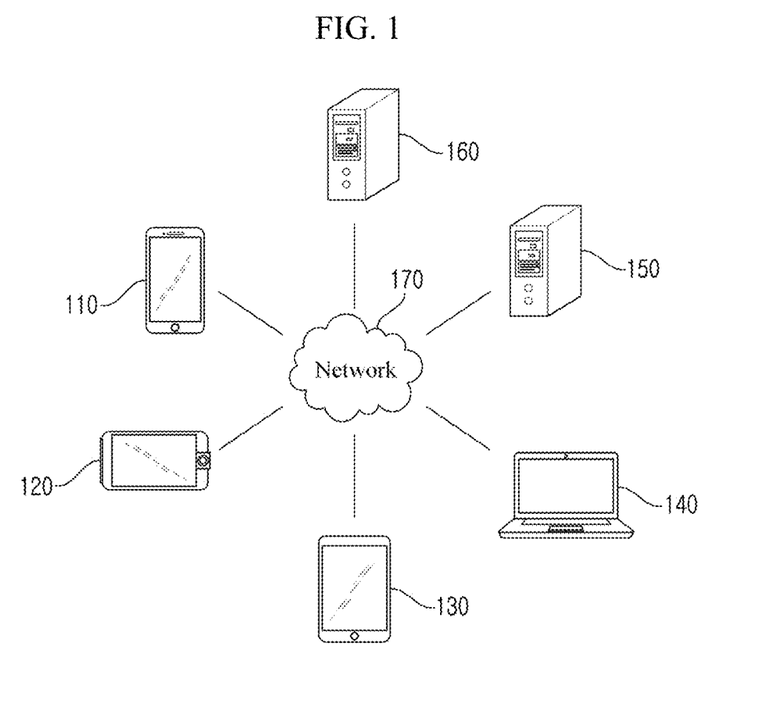
FIG. 1 is a diagram illustrating an example of a network environment according to an embodiment of the present disclosure.

FIG. 1 is a diagram illustrating an example of a network environment according to an embodiment of the present disclosure. FIG. 1 is a diagram illustrating an example of a network environment according to an embodiment of the present disclosure. The network environment of FIG. 1 illustrates an example including a plurality of electronic devices 110, 120, 130, and 140, a plurality of servers 150 and 160, and a network 170. FIG. 1 is an example for a description of an invention, and the number of electronic devices or the number of servers is not limited to FIG. 1. Furthermore, the network environment of FIG. 1 merely describes one of environments which may be applied to the present embodiments, and an environment which may be applied to the present embodiments is not limited to the network environment of FIG. 1.

The plurality of electronic devices 110, 120, 130 and 140 may be stationary devices or mobile devices implemented as computer devices. The plurality of electronic devices 110, 120, 130 and 140 may include a smartphone, a mobile phone, a navigation device, a computer, a laptop computer, a device for digital broadcasting, personal digital assistants (PDA), a portable multimedia player (PMP), and a tablet PC, for example. For example, in FIG. 1, a shape of a smartphone is illustrated as being an example of the electronic device 110. However, in embodiments of the present disclosure, the electronic device 110 may mean one of various physical computer devices capable of communicating with other electronic devices 120, 130 and 140 and/or the servers 150 and 160 over the network 170 substantially using a wireless or wired communication method.

The communication method is not limited, and may include short-distance wireless communication between devices in addition to communication methods using communication networks (e.g., a mobile communication network, wired Internet, wireless Internet and a broadcasting network) which may be included in the network 170. For example, the network 170 may include one or more given networks of a personal area network (PAN), a local area network (LAN), a campus area network (CAN), a metropolitan area network (MAN), a wide area network (WAN), a broadband network (BBN), and the Internet. Furthermore, the network 170 may include one or more of network topologies, including a bus network, a star network, a ring network, a mesh network, a star-bus network, and a tree or hierarchical network, but the present disclosure is not limited thereto.

Each of the servers 150 and 160 may be implemented as a computer device or a plurality of computer devices, which provides an instruction, a code, a file, content, or a service through communication with the plurality of electronic devices 110, 120, 130 and 140 over the network 170. For example, the server 150 may be a system that provides a service (e.g., an archiving service, a file distribution service, a map service, a content provision service, a group call service (or a voice conference service), a messaging service, a mail service, a social network service, a translation service, a financial service, a payment service, and a search service).

Figure 2:
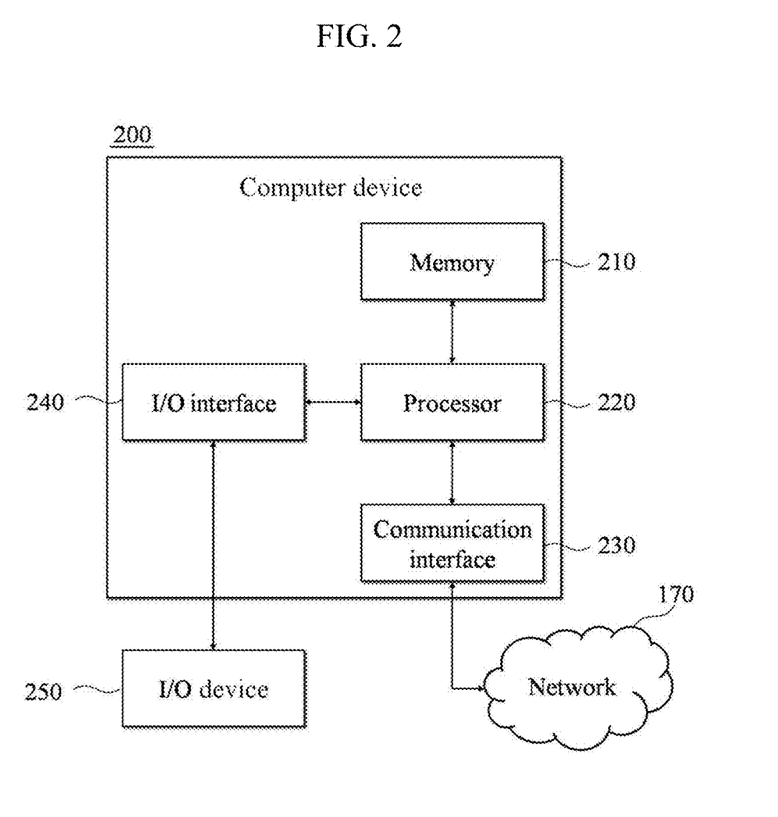
FIG. 2 is a block diagram illustrating an example of a computer device according to an embodiment of the present disclosure.

FIG. 2 is a block diagram illustrating an example of a computer device according to an embodiment of the present disclosure. Each of the plurality of electronic devices 110, 120, 130 and 140 or each of the servers 150 and 160 may be implemented by a computer device 200 illustrated in FIG. 2.

As illustrated in FIG. 2, the computer device 200 may include a memory 210, a processor 220, a communication interface 230, and an input/output (I/O) interface 240. The memory 210 is a computer-readable medium, and may include permanent mass storage devices, such as a random access memory (RAM), a read only memory (ROM) and a disk drive. In this case, the permanent mass storage device, such as a ROM and a disk drive, may be included in the computer device 200 as a permanent storage device separated from the memory 210. Furthermore, an operating system and at least one program code may be stored in the memory 210. Such software components may be loaded from a computer-readable medium, separated from the memory 210, to the memory 210. Such a separate computer-readable medium may include computer-readable recording media, such as a floppy drive, a disk, a tape, a DVD/CD-ROM drive, and a memory card. In another embodiment, software components may be loaded onto the memory 210 through the communication interface 230 not a computer-readable medium. For example, the software components may be loaded onto the memory 210 of the computer device 200 based on a computer program installed by files received over the network 170.

The processor 220 may be configured to process instructions of a computer program by performing basic arithmetic, logic and I/O operations. The instructions may be provided to the processor 220 by the memory 210 or the communication interface 230. For example, the processor 220 may be configured to execute received instructions based on a program code stored in a recording device, such as the memory 210.

The communication interface 230 may provide a function for enabling the computer device 200 to communicate with other devices (e.g., the aforementioned storage devices) over the network 170. For example, a request, an instruction, data or a file generated by the processor 220 of the computer device 200 based on a program code stored in a recording device, such as the memory 210, may be provided to other devices over the network 170 under the control of the communication interface 230. Inversely, a signal, an instruction, data or a file from another device may be received by the computer device 200 through the communication interface 230 of the computer device 200 over the network 170. The signal, instruction or data received through the communication interface 230 may be transmitted to the processor 220 or the memory 210. The file received through the communication interface 230 may be stored in a storage device (i.e., the aforementioned permanent storage device) which may be further included in the computer device 200.

The I/O interface 240 may be means for an interface with an I/O device 250. For example, the input device may include a device, such as a microphone, a keyboard, or a mouse. The output device may include a device, such as a display or a speaker. For another example, the I/O interface 240 may be means for an interface with a device in which functions for input and output have been integrated into one, such as a touch screen. The I/O device 250, together with the computer device 200, may be configured as a single device.

Furthermore, in other embodiments, the computer device 200 may include components greater or smaller than the components of FIG. 2. However, it is not necessary to clearly illustrate most of conventional components. For example, the computer device 200 may be implemented to include at least some of the I/O devices 250 or may further include other components, such as a transceiver and a database.

Figure 3:
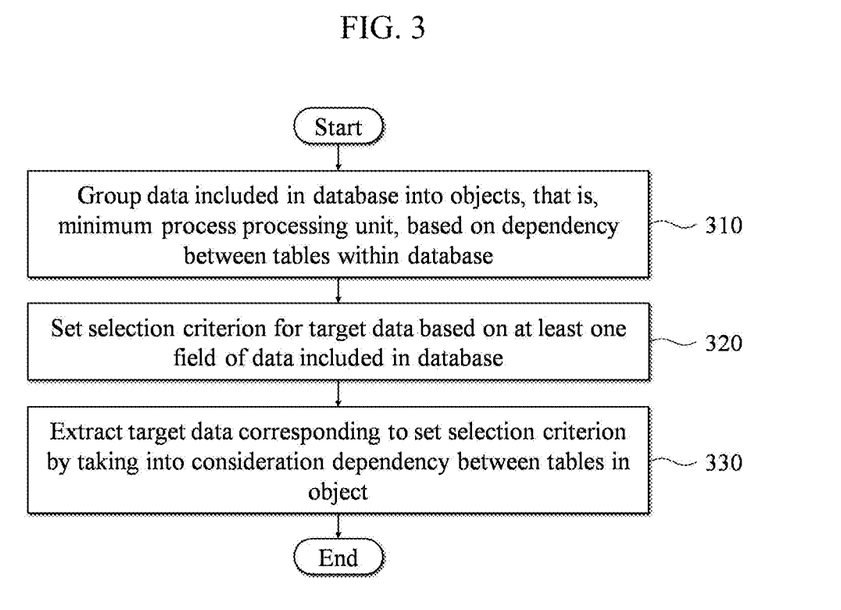
FIG. 3 is a flowchart illustrating an example of a method of selecting target data according to an embodiment of the present disclosure.

FIG. 3 is a flowchart illustrating an example of a method of selecting target data according to an embodiment of the present disclosure. The method of selecting target data according to the present embodiment may be performed by the computer device 200 described with reference to FIG. 2. In this case, the processor 220 of the computer device 200 may be implemented to execute a control instruction according to a code of an operating system or a code of at least one computer program included in the memory 210. In this case, the processor 220 may control the computer device 200 to perform steps 310 to 330 included in the method of FIG. 3 in response to the control instruction provided by a code stored in the computer device 200.

In step 310, the computer device 200 may group data, included in a database, into objects, that is, a minimum process processing unit, based on dependency between tables within the database. For example, the computer device 200 may group tables having dependency as one object within the database. Multiple objects may be defined depending on a database. Dependency between tables may mean that each of two tables includes data identified based on the same key value. In this case, in the tables having dependency, data identified based on the same key value may include at least one different field.

In step 320, the computer device 200 may set a selection criterion for target data based on at least one field of the data included in the database. In this case, the field may be information for identifying the type of each field value included in a data record of a table. For example, the computer device 200 may set the selection criterion for the target data as at least one field based on (1) a period field having a range of a specific time or period related to data as a field value, (2) an organization field having a field value of at least one of a corporate code, a plant, a sales organization and a department, and (3) at least one field of other characteristic fields each having a field value of at least one of a region, a country code, a language, a user, a document type, a customer group and a constructor. In this case, the period field may include a date of creation, a date of a change, a fiscal year, a date of proof, a date of production and release, etc. of table data, for example.

In step 330, the computer device 200 may extract the target data corresponding to the set selection criterion by taking into consideration dependency between tables in the object. For example, the computer device 200 may search for a key value of the highest header table among tables within the object, and may extract the target data by sequentially extracting data corresponding to the retrieved key value based on dependency between tables within the object. Such a method of extracting target data is more specifically described later with reference to FIG. 10.

In some embodiments, the computer device 200 may set the purpose of using the target data as any one of selective archiving, backup, cleansing, transmission, conversion, unidentification and encryption prior to the setting of the selection criterion. In this case, the selection criterion and an object, that is, a selection target, may be different depending on the purpose of using the target data. For example, the computer device 200 may set the selection criterion for the target data further based on the purpose of using the target data set in step 320.

Furthermore, the computer device 200 may classify objects based on at least one of an application area, a data type and a characteristic according to a process. Such classification of objects may be a criterion for selecting an object in which target data will be selected depending on the purpose of using the target data. The classification of objects is more specifically described later with reference to FIG. 4.

Figure 4:
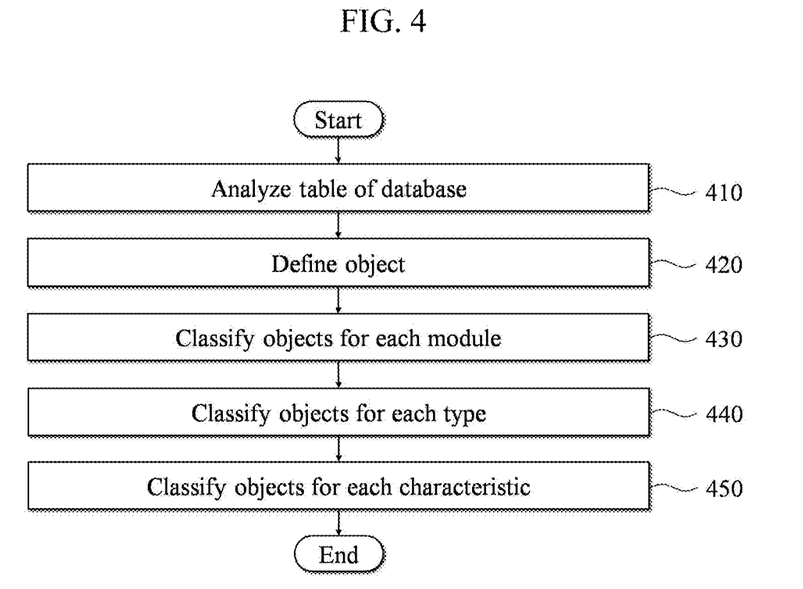
FIG. 4 is a flowchart illustrating an example of a process of defining and classifying objects in an embodiment of the present disclosure.

FIG. 4 is a flowchart illustrating an example of a process of defining and classifying objects in an embodiment of the present disclosure. In some embodiments, steps 410 to 450 illustrated in FIG. 4 may be included and performed in step 310 described with reference to FIG. 3.

In step 410, the computer device 200 may analyze a table of a database.

For example, in step 410, as an analysis task for grouping data into objects and classifying the objects, the computer device 200 may list up all tables within the database, and may exclude a table not having data from an analysis target by analyzing the size and number of cases of a table. In some embodiments, although actual data is not present in a table, the table may be selected as a table, that is, a selection target, but may be excluded from the analysis target.

Furthermore, the computer device 200 may analyze the table field. For example, at least one field (e.g., a period field, an organization field and/or other characteristic fields) considered to set a selection condition within the table may be present or not present. Such analysis of the table field is to analyze which field is included in the table. In the case of a table A having three data fields as in Table 1, the computer device 200 may extract all the three fields for analysis.

TABLE 1

Table A

| Doc. No. | Create Date | Change Date | Order Date |
| --- | --- | --- | --- |
| 1 | 2020 January | 2020 February | 2019 December |
| 2 | 2020 February | | 2020 January |
| 3 | 2020 March | | 2020 February |

Furthermore, the computer device 200 may analyze a distribution of field data. For example, after listing up a table/field as an analysis target, the computer device 200 may analyze a distribution of actual data values within the table/field. For example, in the case of the table A in Table 1, if the date when a data selection query is created (i.e., Create Date) is 2020.01 to 2020.02 and the order date is the year 2020, it may be seen that only one data in which a field value of the field "Doc. No." is "2" is a target for a data selection query. Furthermore, the computer device 200 may analyze a missing value rate, that is, a value of the ratio of the number of tables or fields having a field value and the number of tables or fields not having a field value. For example, when several fields having the same characteristic are present, in order to improve selection accuracy for target data, a missing value rate may be taken into consideration. For example, in Table 2, if target data is selected based on an organization code, it may be reasonable to select a field "Org. Field A" in a table B.

TABLE 2

Table B

| Doc. No. | Org. Field A | Org. Field B | Org. Field C |
| --- | --- | --- | --- |
| 1 | P100 | P100 | |
| 2 | P200 | | P200 |
| 3 | P300 | P300 | |

In addition, the computer device 200 may analyze a table by searching for a field where-used-list (WUL) for each domain. A method of searching for a field WUL for each domain is more specifically described later with reference to FIG. 9. In step 420, the computer device 200 may define an object. For example, the computer device 200 may define several grouped tables as an object based on dependency between tables. Such an object is a minimum process processing unit, and may consist of one or more tables. As a more detailed example, tables of a minimum process processing unit may include tables created for a material master, a customer master, a price condition, a customer credit, a business order, billing, financial statements, account balances, profitability analysis, an interface log, a user log-on history, etc. Such a minimum process processing unit may be variously defined depending on the setting of a company that maintains and manages a corresponding database.

In step 430, the computer device 200 may classify objects for each module. In this case, the module may mean an application area according to each process. The application area may be variously defined as production, sales, materials, financial accounting, management accounting, infrastructure, telecommunications, industry, etc. Such a module may also be variously defined depending on the setting of a company that maintains and manages a database.

In step 440, the computer device 200 may classify the objects for each type. Types for classifying objects may include master data, transaction data, configuration data, control data, system data, etc. For example, the master data may mean data, that is, a criterion for the generation of data. The transaction data may mean data that is continuously generated due to the time when data is generated, an organization, etc. The objects may be classified for each type variously defined depending on the type of data of a table included in an object. In step 450, the computer device 200 may classify the objects for each characteristic.

A characteristic of an object may include a document meaning continuously generated slips/orders, a status in which a current production state of a product is recorded, a history in which a change of a document, etc. is stored, and a summary in which specific period billing of a customer is recorded, for example.

Figure 5:
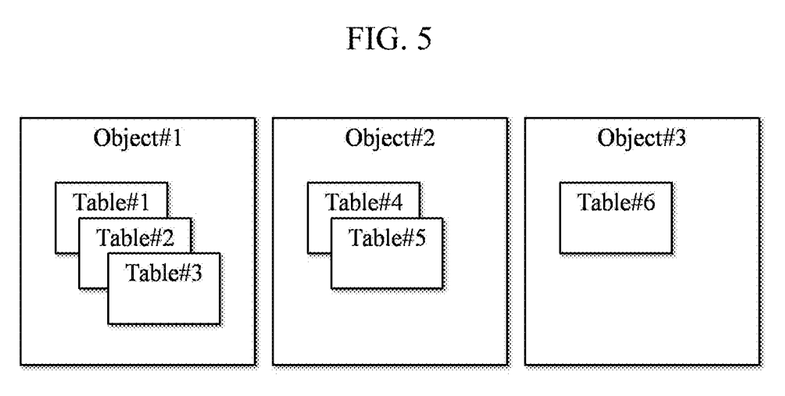
FIG. 5 is a diagram illustrating an example of objects according to an embodiment of the present disclosure.

FIG. 5 is a diagram illustrating an example of objects according to an embodiment of the present disclosure. Furthermore, FIGS. 6 and 7 are diagrams illustrating examples in which objects are classified according to an embodiment of the present disclosure.

FIG. 5 illustrates an object 1 (Object #1) including a table 1 (Table #1), a table 2 (Table #2) and a table 3 (Table #3), an object 2 (Object #2) including a table 4 (Table #4) and a table 5 (Table #5), and an object 3 (Object #3) including a table 6 (Table #6). In this case, it may be seen that the table 1 (Table #1), the table 2 (Table #2) and the table 3 (Table #3) have dependency, and the table 4 (Table #4) and the table 5 (Table #5) have dependency.

Figure 6:
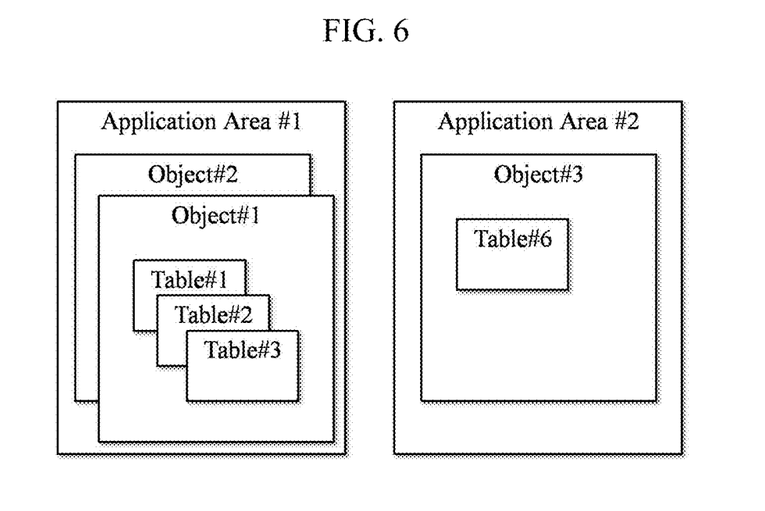
FIGS. 6 and 7 are diagrams illustrating examples in which objects are classified according to an embodiment of the present disclosure.

FIG. 6 illustrates an example in which the object 1 (Object #1) and the object 2 (Object #2) are classified as an application area 1 (Application Area #1) and the object 3 (Object #3) are classified as an application area 2 (Application Area #2). As described above, the application area may correspond to a module.

Figure 7:
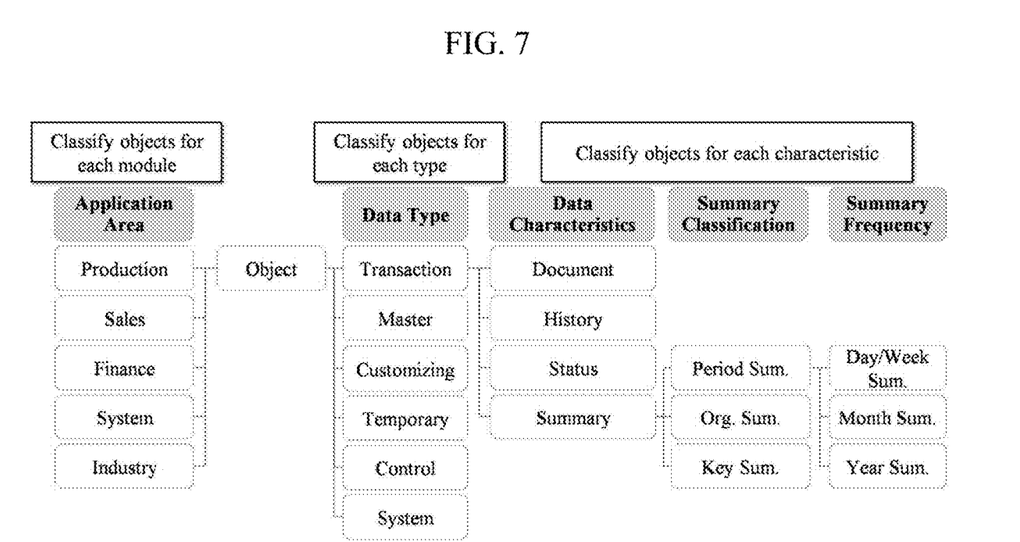

FIG. 7 illustrates an example of a process of classifying objects for each module, type and characteristic. In FIG. 4, it has been described that an application area may be variously defined as production, sales, materials, financial accounting, management accounting, infrastructure, telecommunications, industry, etc. The embodiment of FIG. 7 illustrates that objects may be classified as one of application areas of production, sales, finance, a system and industry. Furthermore, it may be described with reference to FIG. 4 that types for classifying objects may include master data, transaction data, configuration data, control data, system data, etc. The embodiment of FIG. 7 illustrates that the type of object may be classified as one of a transaction data type, a master data type, a customizing data type, a temporary data type, a control data type and a system data type. Furthermore, a document meaning continuously generated slips/orders, a status in which a current production state of a product is recorded, a history in which a change of a document, etc. is stored, and a summary in which specific period billing of a customer is recorded have been described as a characteristic of an object with reference to FIG. 4. Such a characteristic of an object is also incorporated in the embodiment of FIG. 7. Furthermore, the embodiment of FIG. 7 illustrates that objects may be classified in detail as a period summary (Period Sum.), an organization summary (Org.Sum.) and a key summary (Key Sum.) as classification of the summary characteristic (Summary Classification) and illustrates that objects may be classified in detail as a day/week summary (Day/Week Sum.), a month summary (Month Sum.) and a year summary (Year Sum.) as summary frequency of the period summary (Period Sum.). As described above, objects may be variously classified depending on the setting of a company that maintains and manages a corresponding database.

Figure 8:
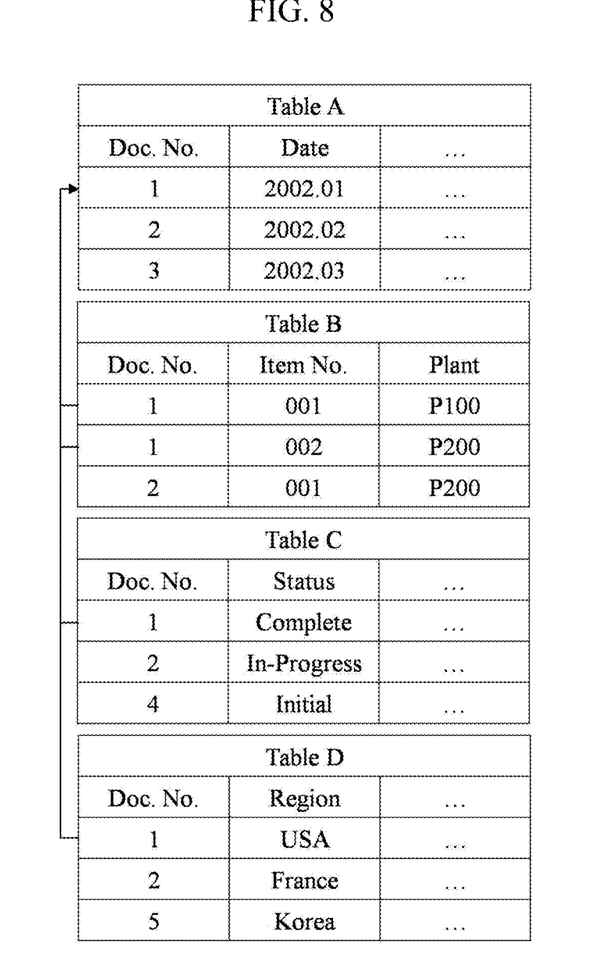
FIG. 8 is a diagram illustrating an example of tables having dependency in an embodiment of the present disclosure.

FIG. 8 is a diagram illustrating an example of tables having dependency in an embodiment of the present disclosure. An object may mean a table bundle of a minimum process processing unit for securing consistency and coordination of data. In other words, tables of an object need to be processed together with respect to a specific process. The embodiment of FIG. 8 illustrates four tables, including a table A, a table B, a table C and a table D having dependency. As described above, dependency between tables may mean that each of two tables includes data identified based on the same key value. In FIG. 8, the table A, the table B, the table C and the table D includes data identified based on the same key value (Doc. No.=1). In this case, a DATE field is included in the table A, a plant field is included in the table B, a status field is included in the table C, and a region field is included in the table D. In this case, if the four tables of the table A, the table B, the table C and the table D are grouped into one object, it can be seen that target data may be selected and extracted using field values of a period, an organization, a status and an area. In contrast, if the table A, the table B, the table C and the table D are not grouped into an object, when target data is selected based on a field value of the period, data consistency may be insufficient because data is absent in the table B, the table C and the table D.

Figure 9:
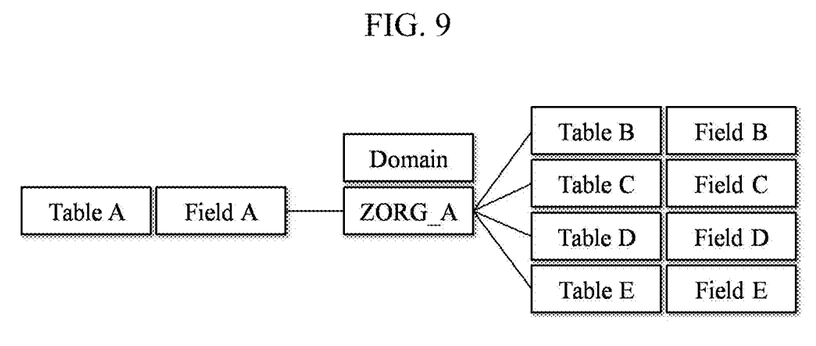
FIG. 9 is a diagram illustrating an example in which a field WUL for each domain is searched for in an embodiment of the present disclosure.

FIG. 9 is a diagram illustrating an example in which a field WUL for each domain is searched for in an embodiment of the present disclosure. A table/field may be selected using a domain. The domain may mean a technical attribute, such as the type or digit number of a field. For example, in Table 2, a field WUL for each domain may be searched for so that tables/fields having the same domain as the domain of the organization field "Org. Field A" in the table B are selected. This is a method, which is consistent and can prevent an omitted table when target data is selected. In the embodiment of FIG. 9, a field B of a table B, a field C of a table C, a field D of a table D, and a field E of a table E having the same domain as a domain "ZORG_A" in the field A of a table A may be searched for, and may be associated with one another and stored. Tables and/or fields having the same domain may be subsequently used to select target data by using the stored data.

Figure 10:
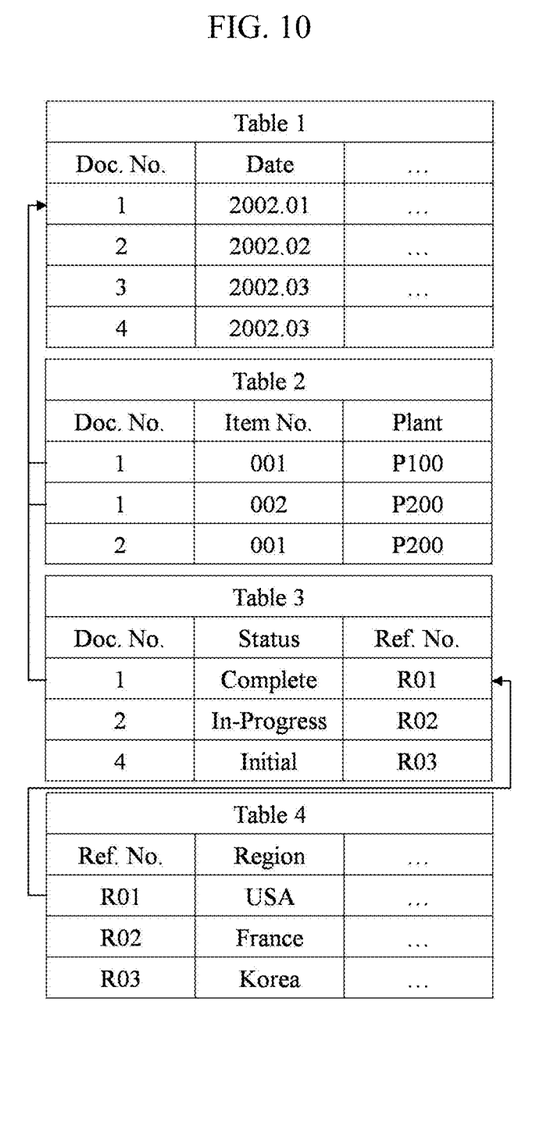
FIG. 10 is a diagram for describing a header table and an item table in a dependency relation in an embodiment of the present disclosure.

FIG. 10 is a diagram for describing a header table and an item table in a dependency relation in an embodiment of the present disclosure. The header table is a table whose key value is unique and is not null, and may mean a table including all key values in a lower table. In this case, the item table may mean all of the remaining lower tables grouped as the same object except the header table. In the embodiment of FIG. 10, Table 1 may be a header table which is unique and includes all of non-null key values 1, 2, 3, and 4. Table 2 has key values 1, 1, and 2 not unique in a field "Doc. No." and does not include key values 3 and 4. Table 3 does not include a key value "3" of a field "Doc. No.". Accordingly, Tables 2 and 3 may be item tables not a header table. Table 4 may become a header table in a separate object. However, in the example of FIG. 10, it is assumed that Table 4 is included in the same object as Table 1, Table 2 and Table 3.

A table relation within the object of FIG. 10 may be represented as in Table 3 below.

TABLE 3

Example of table relation within object

| Sequence | Header table | Item table | Relation |
|---|---|---|---|
| 1 | Table 1 | Table 2 | Doc. No. = Doc. No. |
| 2 | Table 1 | Table 3 | Doc. No. = Doc. No. |
| 3 | Table 3 | Table 4 | Ref. No. = Ref. No. |

In Table 3, a dependency relation is defined, and a header table and an item table are divided. In this case, "Sequence" 1 may mean the highest header table within the object, and may indicate an individual header table in a header table-item table Relation. For example, it is assumed that a selection criterion for target data is to select data in which a field value of a field "Plant" is "P100." In this case, since the field "Plant" is present in Table 2, a Key value that a field value of the field "Plant" satisfies "P100" is a field value "1" of the field "Doc. No.". In this case, in order to consistently extract target data in which a field value of the field "Doc. No." is "1", the target data needs to be sequentially extracted from the header table. For example, data in which a field value of the field "Doc. No." is "1" in Table 1, data in which a field value of the field "Doc. No." is "1" in Table 2, and data in which a field value of the field "Doc. No." is "1" in Table 3 may be sequentially extracted. Furthermore, since data in which a field value of the field "Doc. No." is "1" in Table 3 includes a field value "R01" of a field "Ref. No.", data in which a field value of the field "Ref. No." is "R01" in Table 4 also needs to be extracted.

In setting the selection criterion in step 320 of FIG. 3, the computer device 200 may further set an addition criterion for data to be excluded from target data or data to be added to the target data. For example, the computer device 200 may exclude some of data in selection although the data satisfies a selection criterion, and may add some of data to selection although the data does not satisfies a selection criterion. As a more detailed example, the computer device 200 may exclude, in the selection of target data, data that has not been completed like an in-process or may exclude specific raw data in the selection of target data. Furthermore, for example, the computer device 200 has calculated the range of target data based on a period, but may add in-process data regardless of the period.

The in-process may mean data currently being processed as one of characteristics of the data. For example, the in-process may mean an incomplete state in which the collection/payment of price has not been performed although account payable (AP)/account receivable (AR) has been received, or an incomplete product corresponding to a work in process, which is now being produced. Such addition or exclusion of the in-process may mean that the in-process may be added to a selection condition by checking a specific status as described above. For example, in Table 3 of FIG. 10, when data in which a field value of the field "Plant" is "P100" is to be selected, if data currently present in "In-Process" is also to be added, a target key value may be field values "1" and "2" of the field "Doc. No."

If all of individual tables satisfy a selection criterion, data may be extracted by neglecting a dependency relation. For example, if a table satisfies a selection criterion, this may mean a case where the corresponding table includes a value (i.e., a field value) which may become a selection criterion. As a more detailed example, when a selection criterion is date, if a date field is present in all of individual tables, data included in the corresponding date field may be individually extracted by neglecting dependency of an object. For another example, when a selection criterion is an organization, when an organization field is present in all of individual tables, data included in the corresponding organization field may be individually extracted by neglecting dependency of an object.

The extracted target data may be stored in various media. For example, the extracted target data may be stored in a separate table or may be stored in a separate file. In some embodiments, the extracted target data may be directly transmitted or converted into another device without being stored. Furthermore the target data may be stored or transmitted in a compressed state by using a lossless compression algorithm. For example, ZIP, CTW, LZ77, LZW, gzip, bzip2, DEFLATE, etc. may be used as the lossless compression algorithm.

Furthermore, the extracted target data may be used as depending on various use purposes, such as transmission, conversion, unidentification, and encryption. Alternatively, the extracted target data may also be used for backup or recovery for preventing a loss and deformation of data.

Furthermore, when the extracted target data is stored or transmitted to another medium, the following data incorporation rule may be taken into consideration.

(1) Clear & Insert: when data is inserted, the data needs to be inserted after the existing data is fully deleted.

(2) Modify: selection data needs to be updated with selection data matched with the existing data when the selection data matched with the existing data is present.

(3) Append: selection data is inserted only when there is no selection data matched with the existing data.

As described above, according to embodiments of the present disclosure, target data can be selected by taking into consideration dependency between tables. Furthermore, data can be modulated in a database through selection, a combination, exclusion, an addition, etc. according to various data processing purposes, such as archiving, cleansing, transmission, conversion, encryption, and unidentification, and target data can be selected.

The aforementioned system or device may be implemented by a hardware component or a combination of a hardware component and a software component. For example, the device and components described in the embodiments may be implemented using one or more general-purpose computers or special-purpose computers, like a processor, a controller, an arithmetic logic unit (ALU), a digital signal processor, a microcomputer, a field programmable gate array (FPGA), a programmable logic unit (PLU), a microprocessor or any other device capable of executing or responding to an instruction. The processing device may perform an operating system (OS) and one or more software applications executed on the OS. Furthermore, the processing device may access, store, manipulate, process and generate data in response to the execution of software. For convenience of understanding, one processing device has been illustrated as being used, but a person having ordinary skill in the art may understand that the processing device may include a plurality of processing elements and/or a plurality of types of processing elements. For example, the processing device may include a plurality of processors or a single processor and a single controller. Furthermore, a different processing configuration, such as a parallel processor, is also possible.

Software may include a computer program, a code, an instruction or a combination of one or more of them and may configure a processor so that it operates as desired or may instruct the processing devices independently or collectively. The software and/or data may be embodied in a machine, component, physical device, virtual equipment or computer storage medium or device of any type in order to be interpreted by the processor or to provide an instruction or data to the processing device. The software may be distributed to computer systems connected over a network and may be stored or executed in a distributed manner. The software and the data may be stored in one or more computer-readable recording media.

The method according to an embodiment may be implemented in the form of a program instruction executable by various computer means and stored in a computer-readable medium. The computer-readable medium may include a program instruction, a data file, and a data structure solely or in combination. The medium may continue to store a program executable by a computer or may temporarily store the program for execution or download. Furthermore, the medium may be various recording means or storage means of a form in which one or a plurality of pieces of hardware has been combined. The medium is not limited to a medium directly connected to a computer system, but may be one distributed over a network. An example of the medium may be one configured to store program instructions, including magnetic media such as a hard disk, a floppy disk and a magnetic tape, optical media such as CD-ROM and a DVD, magneto-optical media such as a floptical disk, ROM, RAM, and flash memory. Furthermore, other examples of the medium may include an app store in which apps are distributed, a site in which other various pieces of software are supplied or distributed, and recording media and/or storage media managed in a server.

Examples of the program instruction may include machine-language code, such as a code written by a compiler, and a high-level language code executable by a computer using an interpreter.

As described above, although the embodiments have been described in connection with the limited embodiments and drawings, those skilled in the art may modify and change the embodiments in various ways from the description. For example, proper results may be achieved although the above descriptions are performed in order different from that of the described method and/or the aforementioned components, such as the system, structure, device or apparatus, and circuit, are coupled or combined in a form different from that of the described method or replaced or substituted with other components or equivalents.

Accordingly, other implementations, other embodiments, and equivalents of the claims fall within the scope of the claims.

The embodiments of the invention in which an exclusive property or privilege is claimed are defined as follows:

1. A method of selecting, by a computer device comprising least one processor, target data, the method comprising steps of:
    defining, by the at least one processor, objects in a database maintained by a first company as groups of two or more database tables having dependency with one another, the objects each being a minimum process processing unit based on the dependency between the database tables within the database;
    classifying, by the at least one processor, the objects based on at least one of an application area, a data type and a characteristic according to a process;
    setting, by the at least one processor, a selection criterion for target data based on at least one field of the data included in the database and the classification of the objects; and
    extracting, by the at least one processor, target data for transfer from the first company to a second company corresponding to the set selection criterion by taking into taking into consideration dependency between the database tables included in the objects, wherein the step of extracting target data comprises searching a field where-used-list (WUL) so that fields in the tables having the same domain are selected.

2. The method of claim 1, wherein the step of setting selection criterion comprises setting the selection criterion for the target data based on (1) a period field having a range of a specific time or period related to data as a field value, (2) an organization field having a field value of at least one of a corporate code, a plant, a sales organization and a department, and (3) at least one field of other characteristic fields each having a field value of at least one of a region, a country code, a language, a user, a document type, a customer group and a constructor.

3. The method of claim 1, further comprising a step of setting, by the at least one processor, a purpose of using the target data as any one of selective archiving, backup, cleansing, transmission, conversion, unidentification and encryption.

4. The method of claim 3, wherein the selection criterion and an object which is a selection target are different depending on a use target of the set target data.

5. The method of claim 1, wherein the step of extracting target data comprises:
    searching for a key value of the highest header table among the database tables within the object, and
    extracting the target data by sequentially extracting data corresponding to the retrieved key value based on the dependency between the database tables within the object.

6. The method of claim 1, further comprising a step of setting, by the at least one processor, an addition criterion for data to be excluded from the target data or data to be added to the target data.

7. A non-transitory computer-readable recording medium having stored thereon a computer program configured to cause one or more computer devices to perform steps comprising:
    defining, by at least one processor, objects in a database maintained by a first company as groups of two or more database tables having dependency with one another, the objects each being a minimum process processing unit based on the dependency between the database tables within the database;
    classifying, by the at least one processor, the objects based on at least one of an application area, a data type and a characteristic according to a process;
    setting, by the at least one processor, a selection criterion for target data based on at least one field of the data included in the database and the classification of the objects; and
    extracting, by the at least one processor, target data for transfer from the first company to a second company corresponding to the set selection criterion by taking into taking into consideration dependency between the database tables included in the objects, wherein the step of extracting target data comprises searching a field where-used-list (WUL) so that fields in the tables having the same domain are selected.

8. A computer device comprising:
    at least one processor implemented to execute a computer-readable instruction,
    wherein the at least one processor is configured to:
    define objects in a database maintained by a first company as groups of two or more database tables having dependency with one another, the objects each being a minimum process processing unit based on the dependency between the database tables within the database,
    classify the objects based on at least one of an application area, a data type and a characteristic according to a process,
    set a selection criterion for target data based on at least one field of the data included in the database and the classification of the objects, and
    extract target data for transfer from the first company to a second company corresponding to the set selection criterion by taking into consideration dependency between the database tables included in the objects, wherein the extracting of the target data comprises searching a field where-used-list (WUL) so that fields in the tables having the same domain are selected.

* * * * *

UNITED STATES PATENT AND TRADEMARK OFFICE
CERTIFICATE OF CORRECTION

| | | |
|---|---|---|
| PATENT NO. | : 11,372,899 B2 | |
| APPLICATION NO. | : 17/409631 | |
| DATED | : June 28, 2022 | |
| INVENTOR(S) | : O. Kim | |

It is certified that error appears in the above-identified patent and that said Letters Patent is hereby corrected as shown below:

In the Claims

| Column | Line | |
|---|---|---|
| 13 | 57-58 | Claim 1 change "taking into taking into" to -- taking into -- |
| 14 | 45-46 | Claim 7 change "taking into taking into" to -- taking into -- |

Signed and Sealed this
Eighth Day of August, 2023

Katherine Kelly Vidal
*Director of the United States Patent and Trademark Office*